UNITED STATES PATENT OFFICE.

HENRI RAYMOND VIDAL, OF PARIS, FRANCE.

PROCESS OF MAKING AMIDOPHENOLS.

SPECIFICATION forming part of Letters Patent No. 618,809, dated January 31, 1899.

Application filed June 27, 1898. Serial No. 684,622. (No specimens.)

*To all whom it may concern:*

Be it known that I, HENRI RAYMOND VIDAL, a citizen of the Republic of France, and a resident of Paris, France, have invented new and useful Improvements in the Production of Amidophenols and Amidonaphthols, which is fully set forth in the following specification.

I have found that when oxidizing agents—such as the peroxids of manganese, lead, and barium or other peroxids—are caused to act upon amido-sulfonic acids of the aromatic series in a concentrated sulfuric medium the sulfo group of the acid employed will be transformed into oxyhydrid. The corresponding amidophenols or naphthols are thus obtained, sulfurous acid being disengaged in the reaction.

Example: I take eighty-five kilograms of parasulfanilic acid, seventy kilograms of peroxid of manganese, and three hundred and fifty kilograms of sulfuric acid of 66° Baumé. The sulfuric acid is added in a large enameled cast-iron vessel to the peroxid of manganese and to the sulfanilic acid, which have been previously intimately mixed. The product is heated to about 60° centigrade. At the moment a commencement of the reaction is observed the fire is extinguished and the reaction then goes on spontaneously, causing a considerable increase in the volume of the mass, which solidifies as it cools. The mass is dissolved in the requisite amount of water and is then filtered. The acid liquor thus obtained is neutralized, and the salt of manganese formed is precipitated by carbonate of soda. The hot solution is again filtered and the filtered liquid sufficiently reduced enables almost the whole amount of the paramidophenol formed to be precipitated as the solution cools.

In the preceding reaction I may substitute for the parasulfanilic acid meta-sulfanilic acid, naphthionic acid, and other sulfo-naphthylamins, alpha or beta, &c.

I claim—

The herein-described process of reacting upon an amido-sulfonic acid of the aromatic series in a concentrated sulfuric-acid solution with an oxidizing agent, as set forth.

In testimony whereof I have signed this specification in the presence of two subscribing witnesses.

HENRI RAYMOND VIDAL.

Witnesses:
EDWARD P. MACLEAN,
ANTOINE ROUSSANNER.